United States Patent [19]

Enz

[11] 4,099,343
[45] Jul. 11, 1978

[54] SPINNER

[76] Inventor: Ludwig A. Enz, Kreuzstrasse 17, D-6983 Kreuzwertheim, Fed. Rep. of Germany

[21] Appl. No.: 751,982

[22] Filed: Dec. 20, 1976

[30] Foreign Application Priority Data

Dec. 23, 1975 [DE] Fed. Rep. of Germany ....... 2558439

[51] Int. Cl.² .......................................... A01K 85/00
[52] U.S. Cl. ................................................ 43/42.19
[58] Field of Search .................... 43/42.19, 42.2, 42.16, 43/42.17, 42.18

[56] References Cited

U.S. PATENT DOCUMENTS

| 2,086,008 | 7/1937 | Turner | 43/42.2 |
| 2,598,965 | 6/1952 | Bain | 43/42.11 |
| 2,619,761 | 12/1952 | Homa | 43/42.19 |
| 2,796,695 | 6/1957 | Meulnart | 43/42.19 X |

Primary Examiner—Hugh R. Chamblee
Attorney, Agent, or Firm—Brady, O'Boyle & Gates

[57] ABSTRACT

An S-shaped narrow strip of material bent about its broad side has bores through the center and opposite end portions that engage with minimal rotation friction on a straight wire axis adapted for connection to a fish line at one end and bent upon itself at the opposite end to form a U-shaped retainer for at least one fish hook. The ends of the S-shaped strip are twisted about the longitudinal axis thereof at acute angles to the plane of the strip to produce rotation of the strip about the wire axis when raised and lower or drawn through the water. Curved surface elements are connected on the wire axis outboard of the ends of the S-shaped strip and at least one is freely displaceable on the wire axis. A weight is axially movable on the wire axis to encompass the U-shaped end thereof to retain the hook thereon.

2 Claims, 1 Drawing Figure

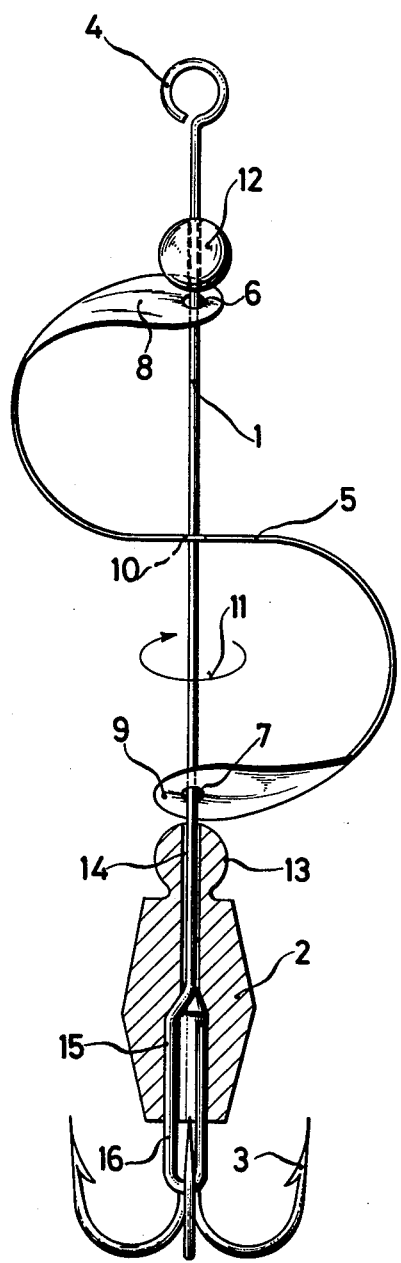

SPINNER

BACKGROUND OF THE INVENTION

The present invention relates to a spinner which is especially suitable for fishing in deep water.

It is known in the prior art to provide a spinner with a propeller which is disposed in front of a fish body on an artificial lure. When pulled against the current this type of spinner can also be moved into deep water and directed towards the hiding places of predatory trout. However, these spinners are not effective in still or very deep waters.

The object of the present invention is to ensure rotation of the spinner in waters of any depth simply by raising it slowly and releasing it.

SUMMARY OF THE INVENTION

This object is attained according to the invention by means of an S-shaped narrow material strip which is bent about its broad side and through the center and ends of which the normal wire axis of the spinner is freely passed and whose ends are twisted about the longitudinal axis of the strip in the same direction of rotation and at an acute angle with respect of the plane of the strip. Minimal friction of the strip on the wire or hook shank axis is obtained if elements comprising curved surfaces such as pellets or spheres are disposed adjacent to the ends of the strip on the wire axis, at least one of these pellets being freely displaceable on the wire axis.

The lower end of the wire axis is preferably bent back in a U-shape. It is secured in a central bore in a weight and also serves to hold the hook or hooks.

BRIEF DESCRIPTION OF THE DRAWING

The drawing shows a side view of a spinner according to the invention in diagrammatic form, the view being partly in longitudinal section.

DESCRIPTION OF THE PREFERRED EMBODIMENT

A spinner acccording to the invention includes a conventional wire axis 1, a weight 2, which can be omitted when fishing in shallow waters, and a hook 3. A loop 4 at the upper end of the wire axis or shank of the spinner is connected in a conventional manner to a fishing line.

According to the invention the wire axis 1 is relatively long and receives an S-shaped strip 5 which is curved about its broad side. The wire axis 1 passes freely through the bores 6 and 7 through the ends 8 and 9 of the strip and through central bore 10 through the center portion of the broad strip which is at right angles to the wire axis 1 in the area of the central bore 10. The two ends 8 and 9 of the strip are curved in a counter-clockwise direction, when viewed from the ends, and at an acute angle with respect to the surface of the strip and about the strip axis such that when the spinner is raised in water, the strip rotates in the direction of the arrow 11 and, when the strip is lowered, its direction of rotation changes. The oblique ends 8 and 9 of the strip 5 are disposed adjacent to pellets or spherical members 12 and 13 engaged on the wire axis 1, one of which 12 is freely displaceable on the wire axis. In the embodiment shown, the other pellet 13 is formed as part of the weight 2. In addition to a narrow bore 14 for the passage of the wire axis 1 therethrough, the weight 2 also includes an expanded bore 15 at the opposite end from the pellet 13. The bore 15 retains and encloses the lower, U-shaped curved-back end 16 of the wire axis 1. The U-shaped bent end 16 of the wire axis serves to secure the hook or hooks 3 to the wire axis 1 and the weight 2, by enclosing the U-shaped end 16 within its bore 15, prevents the hooks from slipping off of or disengaging from the U-shaped end.

The pellets or spherical members 12 and 13 can be replaced by short, tubular sections which are curved at one end, that is the end toward the strip 5. When fishing in shallow waters the weight 2 can also be omitted. As a result, the rotation of the S-shaped strip 5 not only simulates a fish but the tumbling movement of the spinner caused by the removal of the weight 2 encourages the predatory fish to bite or strike at the spinner.

The smaller the size of the spinner to be displaced the more rapid will be the rotation movement even when the spinner is moved up and down slowly. The strip 5 is therefore preferably made of light metal and the like and, on account of the softness of most light metals, it is advisable to provide a reinforcing fin (not shown in the drawing) extending in the middle of the strip 5 in the longitudinal direction thereof.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

What is claimed is:

1. A fishing spinner comprising a centrally disposed wire axis including a loop at its upper end, and S-shaped narrow strip curved about its broad side and having boresthrough the middle and opposite end portions thereof, said wire axis passing freely through the bores in said middle and opposite end portions, a bead element between said loop and the S-shaped strip and including a center bore through which said wire axis passes and a curved bearing surface thereon adapted to engage the top end portion of the S-shaped strip, the opposite end portions of said strip terminating immediately adjacent said wire, the opposite end portions for a substantial length of the S-shape inwardly from their intersection with said wire axis being twisted about the longitudinal axis of said strip in the same direction of rotation and at an acute angle with respect of the plane of said strip, said wire axis including a lower end bent back in a U-shaped portion, a weight having a central bore through which said wire axis passes, said weight having a curved bearing contact surface on the top thereof positioned immediately below said S-shaped strip, a fish hook secured on said U-shaped portion, and the central bore at its lower end being enlarged and receiving said U-shaped portion to retain said fish hook thereon.

2. A fishing spinner as set forth in claim 1, in which said strip is constructed of light metal.

* * * * *